United States Patent [19]

Suarez

[11] Patent Number: 5,492,472
[45] Date of Patent: Feb. 20, 1996

[54] APPARATUS FOR TEACHING MECHANICAL DRAWING SKILLS

[76] Inventor: Sondra W. Suarez, 201 Valeworth Dr., Irmo, S.C. 29063

[21] Appl. No.: 272,095

[22] Filed: Jul. 8, 1994

[51] Int. Cl.⁶ ................................................ G09B 11/00
[52] U.S. Cl. .............................. 434/92; 434/89; 434/85; 33/1 K
[58] Field of Search .................. 434/85, 88, 89, 434/90, 91, 92, 96, 403; 33/1 K

[56] References Cited

U.S. PATENT DOCUMENTS

| | | | |
|---|---|---|---|
| 471,442 | 3/1892 | Starks | 434/92 |
| 1,049,241 | 12/1912 | Knapp | 434/92 |
| 1,602,356 | 10/1926 | Franz | 434/88 |
| 2,319,162 | 5/1943 | Short | 434/92 |
| 2,335,941 | 12/1943 | Howard | 434/92 |
| 2,338,850 | 1/1944 | Heyden | 434/92 |
| 2,835,987 | 5/1958 | Heiser | 434/85 |
| 2,977,688 | 4/1961 | Redey | 434/92 |
| 3,590,499 | 7/1971 | Rinehuls | 434/92 |
| 3,851,394 | 12/1974 | Ihms | 434/91 |
| 4,306,868 | 12/1981 | Hankins | 434/85 |
| 4,604,062 | 8/1986 | Woods | 434/88 |
| 4,696,706 | 9/1987 | Griffin et al. | 156/62 |
| 5,080,590 | 1/1992 | Frisque | 434/88 |
| 5,100,325 | 3/1992 | Cutler | 434/91 |

Primary Examiner—Ren Yan
Assistant Examiner—Lynn D. Hendrickson
Attorney, Agent, or Firm—Michael A. Mann

[57] ABSTRACT

An apparatus and method for teaching skills related to the preparation and interpretation of mechanical drawings, including a box with two opposing, hingedly-attached panels that open to form a pair of work surfaces, a set of cards depicting isometric views and orthographic projections, a set of cubes, a set of pieces for use in constructing isometric views and orthographic projections, a timer, and dice. The interior of the box may contain a plurality of compartments dimensioned for storing the components of the apparatus, a turntable and a slot for holding a card. The apparatus enables the user to practice a variety of drawing-related skills, including: using the pieces and cubes to construct two-dimensional and three-dimensional representations, respectively, of an object represented on a card; using the pieces to construct two-dimensional representations of a three-dimensional object constructed with the cubes; and preparing isometric views from orthographic projections and vice versa.

20 Claims, 2 Drawing Sheets

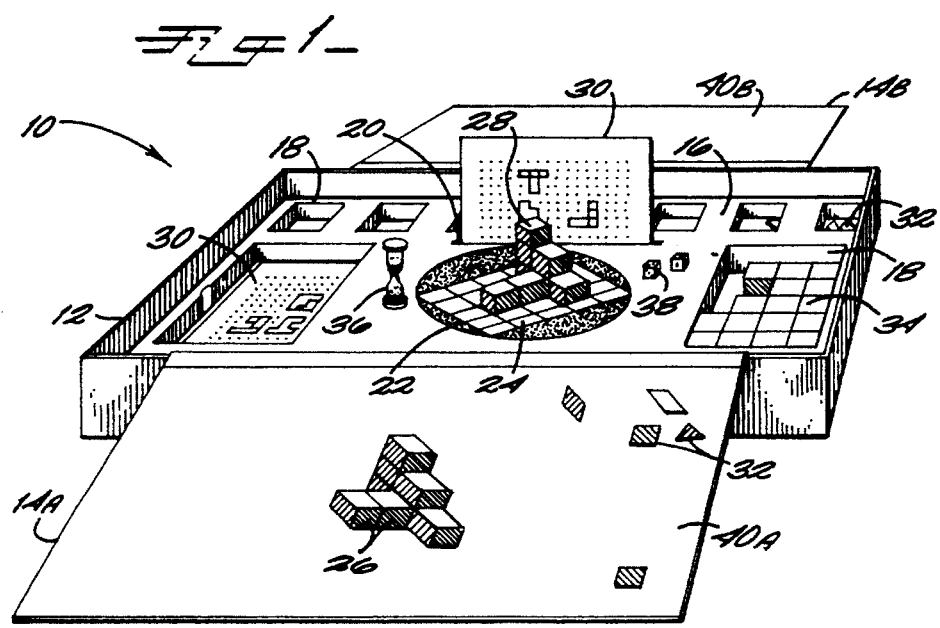
FIG. 1
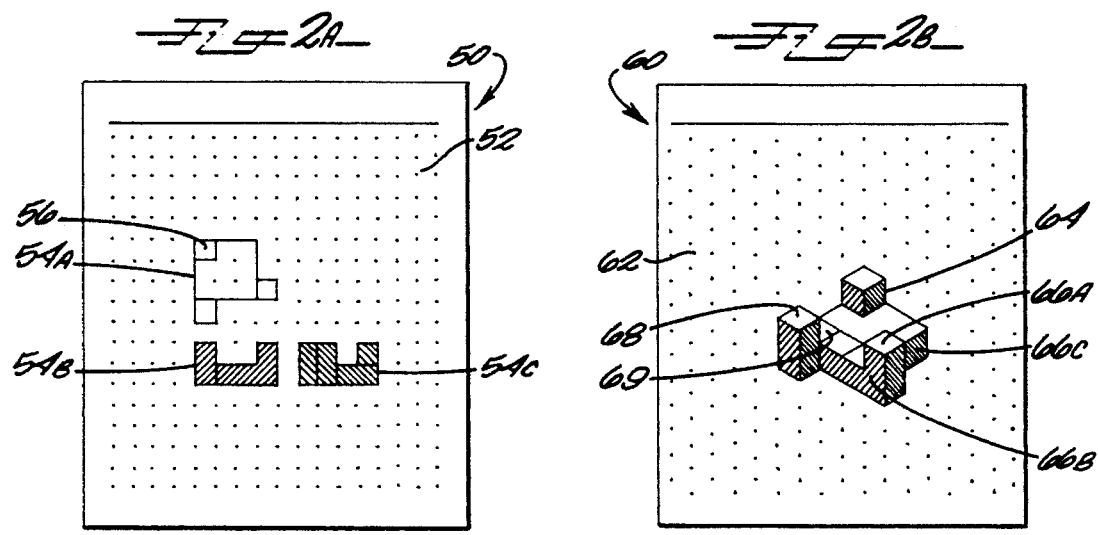
FIG. 2A
FIG. 2B
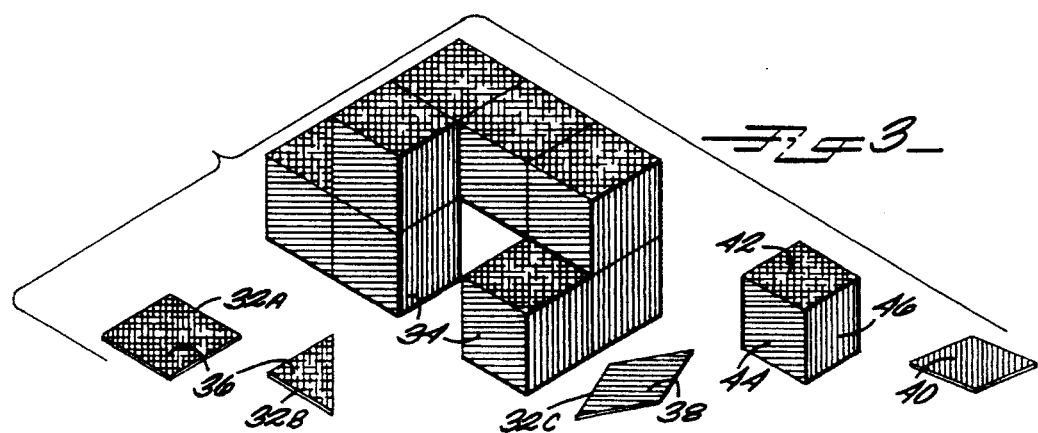
FIG. 3

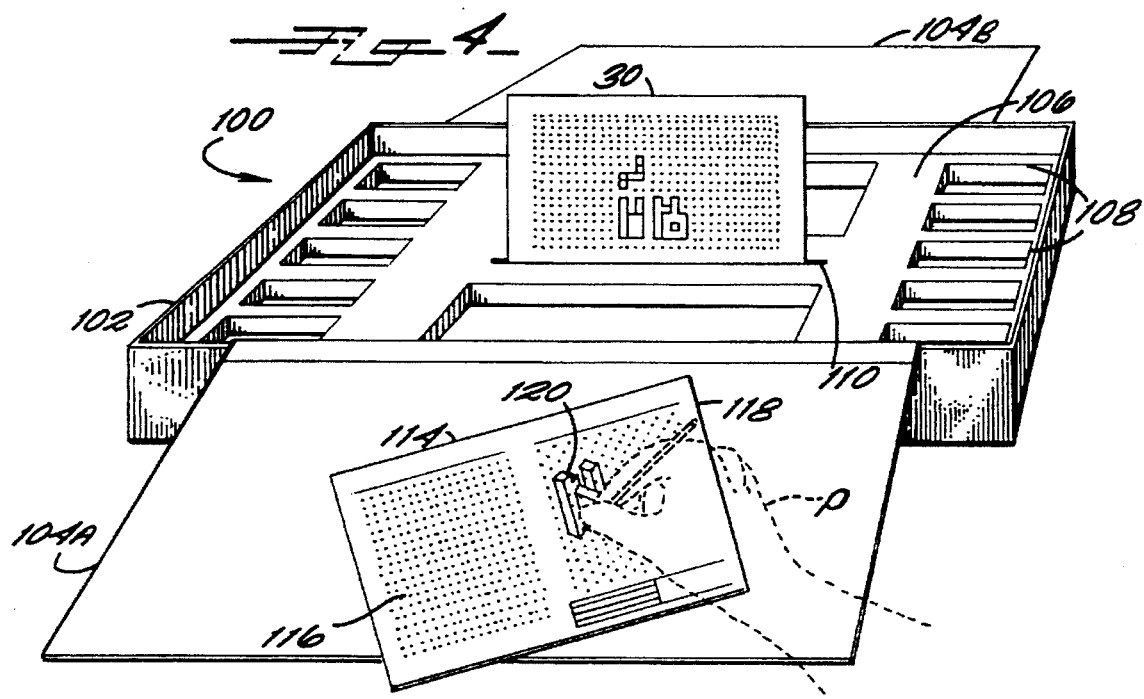
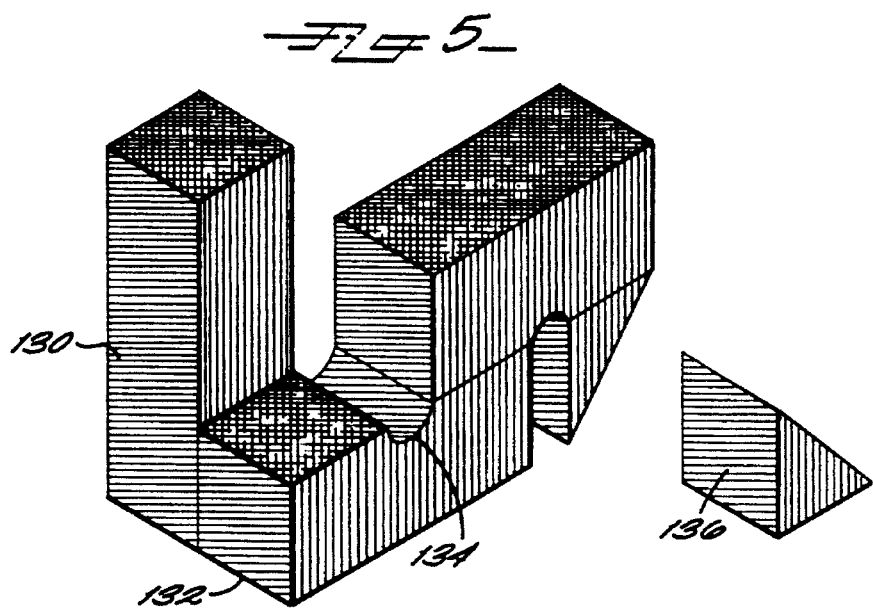

APPARATUS FOR TEACHING MECHANICAL DRAWING SKILLS

BACKGROUND OF THE INVENTION

1. Field of the Invention

The present invention relates to the teaching of skills needed to interpret and prepare mechanical drawings. In particular, the present invention relates to an apparatus for teaching the interpretation and preparation of isometric views and orthographic projections of objects.

2. Discussion of Background

Mechanical drawings known as "working drawings" provide the information needed for construction of each part of a manufactured product and for the correct assembly of the finished product. Without drawings, it would be difficult, if not impossible, to describe a product in sufficient detail for a skilled technician to accurately construct the product.

In order to understand the information in a working drawing, a person must be able to "read" the drawing, that is, interpret it well enough to visualize the three-dimensional object shown in the two-dimensional drawing. Commonly-used working drawings include isometric views and orthographic projections. In an isometric view, also known as an axonometric projection, the object being drawn is turned so that three mutually perpendicular edges are equally foreshortened. Isometric views are usually constructed with the height along the vertical axis, and the front (width) and right side (depth) projected at angles of 30 degrees from the horizontal so that the front slants up-left and the right side slants up-right. Every surface on an isometric view represents either a top, a front, or a right side. Thus, the object looks about the same as it would in a photograph, which is a two dimensional representation or reproduction of a three-dimensional object, with the dimensions of the object shown in proportion.

An orthographic projection shows separate two-dimensional views of three sides of the object, with each view shown as if the viewer was looking at that side, straight-on, at eye level. The most common views used are the top, front and fight side, arranged in a systematic way to assist the person who is reading the views to visualize the object. Experienced viewers are able to visualize a three-dimensional object by systematically examining the three two-dimensional orthographic projections.

Students learn to prepare and interpret mechanical drawings by practicing a variety of tasks, including copying previously-executed drawings, preparing isometric views and orthographic projections of three-dimensional models, and preparing isometric views from orthographic projections and vice versa. The lessons in a typical course of instruction are presented in a predetermined order, with successive lessons involving more advanced and difficult concepts.

A number of devices are known for teaching drawing, including drawing kits for creating perspective drawings from projections (Cutler, U.S. Pat. No. 5,100,325), and various educational toys (Frisque, U.S. Pat. No. 5,080,590; Hankins, U.S. Pat. No. 4,306,868; Redey, U.S. Pat. No. 2,835,987). Drawing aids include a mechanical drawing guide (Heiser, U.S. Pat. No. 2,835,987), adhesive shapes for use as a computer logic design aid (Griffin, et al., U.S. Pat. No. 4,696,706), and magnetic objects placed on a metal surface with a set of grid lines (Ihms, U.S. Pat. No. 3,851, 394). Rinehuls (U.S. Pat. No. 3,590,499) uses three colors to identify the top, front and side of the shapes in his mechanical drawing kit, and Redey (U.S. Pat. No. 2,977,688) combines objects with standard shapes to make front, side and top views against a three-sided, grid-lined chart.

The ability to visualize and interpret geometric shapes varies widely among people, but may be improved by practice. Ideally, students are presented with a set of lessons involving successively more advanced and difficult concepts, and proceed to a next lesson only after mastering the concepts of the preceding lessons. However, different students progress at different rates, thus, it may be difficult for an instructor to teach all students in a class effectively. No known drawing kit provides the capability for self-paced learning combined with the capability for practicing a variety of different drawing-related tasks: preparing isometric views and orthographic projections of a three-dimensional object, preparing three-dimensional models from isometric views and/or orthographic projections, and preparing isometric views from orthographic projections and vice versa.

SUMMARY OF THE INVENTION

According to its major aspects and broadly stated, the present invention is an apparatus and method for teaching skills related to the reproduction and interpretation of views of objects as part of the process of learning how to read and prepare mechanical drawings, working drawings and the like. Reproduction means the copying of either an isometric view or one or more orthographic views of the object. Interpretation means preparing an isometric view from orthographic views or vice versa. The term "object" will be used herein to refer to the three-dimensional solid object that is represented by these views. The apparatus includes a container with two opposing, hingedly-attached panels that open to form work surfaces, a set of cards depicting isometric views and orthographic projections of the same object on opposing sides of the cards, and a set of pieces for use in reproducing or interpreting two-dimensional isometric views and orthographic projections. The pieces are colored, flat polygonal shapes, preferably made of plastic that can be placed in adjacent relationship to form the views desired. Additional components may include a set of solid forms such as cubes, a timer, dice, worksheets and instruction materials. The interior of the box may contain a plurality of compartments dimensioned for storing the cards, pieces, cubes, and other components of the apparatus, a slot dimensioned for receiving a card, and a turntable on which to arrange the forms into an object for viewing it from different sides.

As but one example of the use of the present invention, a user may select a card turned with a set of orthographic views facing toward her. Using it as a guide, the user will interpret the three orthographic views and assemble the correct pieces to represent her isometric interpretation of the orthographically shown object. If the object can be defined in terms of an arrangement of cubes in full face-to-face arrangement, the pieces will be either triangles or parallelograms. If the top of the object is indicated by the color yellow, the front by blue and the right side by red, pieces having these same colors can be selected and oriented so that the isometric representation has the same color system.

A major feature of the present invention is the use of objects that can be defined in terms of solid forms (preferably cubes) that in turn can, in both orthographic views and isometric views, be represented by a limited number of shapes of pieces (namely, squares, triangles and parallelograms). These pieces can be arranged and oriented to reproduce and interpret these views. This feature eliminates the need to draw the views and allows the student to concentrate on the development of reproduction and interpretation skills. The user is free to focus on the conceptual tasks of visualizing and interpreting the object. Understanding the configuration of the object is simplified because the objects are made up of a relatively small number of shapes of pieces.

Another important feature of the present invention is the use of colors to indicate the top, front and sides of the objects. The views on the cards, the pieces, and the cubes all carry the same indicia of orientation. Thus all the components are identically color-keyed, in the preferred embodiment, for ease of orientation.

The cards are another feature of the present invention. The cards carry orthographic views of the same object that is shown in isometric view on the reverse side. Preferably, each side shows two objects so that two users, one viewing each side, can see either the orthographic views or the isometric views of a different object. The cards show objects of varying levels of difficulty.

Including solid forms, such as cubes, in the apparatus is another feature of the present invention. Users can construct their own objects to represent. A turntable in the preferred embodiment of the present invention allows the user to orient this object to see the different views of it.

The timer and the dice constitute another feature of the present invention that can add competitive aspects to its use, as will be described more completely herein, making it a game played against time and producing more complex objects to represent.

Still another feature of the present invention is the cooperation between the work surfaces and the pieces. When placed on a panel, the pieces remain in place so that additional pieces can be added to construct an isometric view or orthographic projection. The panels may be covered with a high-friction material to resist slipping, or be metallic so that magnetized items adhere thereto. Alternatively, the pieces may be attached by means of hook-and-loop fasteners such as VELCRO™, or a surface of each piece may be coated with a low tack adhesive so that the piece can easily be removed from a panel.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of an apparatus according to a preferred embodiment of the present invention;

FIG. 2A is a detailed view of a card according to a preferred embodiment of the present invention, showing three orthographic projections of an object;

FIG. 2B is a detailed view of another card according to a preferred embodiment of the present invention, showing an isometric view of the object depicted in FIG. 2A;

FIG. 3 is a perspective view of some two-dimensional and three-dimensional items according to a preferred embodiment of the present invention;

FIG. 4 is a perspective view of an article according to another preferred embodiment of the present invention; and FIG. 5 is a perspective view of some three-dimensional items according to another preferred embodiment of the present invention.

DETAILED DESCRIPTION OF A PREFERRED EMBODIMENT

Referring now to FIG. 1, there is shown a perspective view of an apparatus 10 according to a preferred embodiment of the present invention. Apparatus 10 includes a box 12 with two opposing, hingedly-attached panels 14a, 14b. An insert 16 is fitted into the interior of box 12, or, if preferred, integrally formed with box 12. Insert 16 is provided with a plurality of recessed compartments 18 and at least one slot 20. Insert 16 may also have a turntable 22 with a grid 24. Box 12 may be generally rectangular with two panels 14a, 14b as shown, or of some other shape (square, oval, and so forth). If desired, box 12 may have a different number of panels, either attached to the box or storable therein.

Compartments 18 are dimensioned for containing various components of apparatus 10, which components may include cards 30 depicting isometric (perspective) views and orthographic projections (top, front and right side views), pieces 32 (closed plane figures bounded by straight lines), cubes 34, a timer 37, and dice 39.

Cards 30 may include cards such as a card 50 depicting an orthographic projection (FIG. 2A). Card 50 carries a plurality of dots arranged in a square grid 52, and three views 54a, 54b, 54c drawn using the dots of grid 52 as a guide. To assist the viewer in visualizing the figure depicted on card 50, views 54 are arranged in a systematic manner: view 54a is the top view, view 54b the front view, and view 54c the right side view, in accordance with standard mechanical drawing convention. If desired, view 54c may be a left side view or some other view. Apparatus 10 preferably includes a number of cards showing orthographic projections of different objects, therefore, views 54 are consistent from card to card. In addition, views 54 may be colored. By way of example, top view 54a may be yellow, front view 54b, blue, and right side view 54c, red, although other combinations of colors and other indicia of orientation may also be used.

Cards 30 may also include cards showing isometric views, such as a card 60 (FIG. 2B). A card 60 carries a plurality of dots arranged in a hexagonal grid 62, and an isometric view 64 drawn on the grid. View 64 shows the top, front and right sides of the article shown on card 50, with the front and right sides projected at angles of approximately 30° from the horizontal (60° from the vertical). However, different surfaces and different grid layouts (for different corresponding projection angles) may be used without departing from the spirit of the invention. Preferably, top surfaces 66a, front surfaces 66b, and right side surfaces 66c are colored to match top view 54a, front view 54b, and right side view 54c, respectively, of FIG. 2A. Alternatively, other indicia may be used to differentiate the top, front and side surfaces shown in FIGS. 2A and 2B, for example, patterns, letters, numbers or other symbols, etc.

The objects represented on cards 30 are selected so that they can be defined by one or only a few solid forms, such as cubes, so that these objects can be represented by relatively few different shapes of pieces. For example, if the objects are cubes and they are arranged in full face-to-face configuration, their isometric and orthographic views can be represented by pieces in the shape of square, triangular, and parallelogram-shaped pieces. Specifically, orthographic projections (FIG. 2A) may be made up of a plurality of squares 56, and isometric views (FIG. 2B), a plurality of parallelograms 68 and triangles 69. Other types of solid forms can be used but carry with them considerably increased complexity. An orthographic projection may be made up of rectangles or other regular polygons, and its isometric view composed of corresponding polygons.

Cards 30 preferably have an isometric view (such as shown in FIG. 2B) on one side, and an orthographic projection of the same article (as shown in FIG. 2A) on the other side. Cards 30 may also include views of two or more different articles: for example, an isometric view of a first article and an orthographic projection of a second article on one side, and an orthographic projection of the first article and an isometric view of the second article on the other side.

Apparatus 10 includes a set of pieces used to construct representations of objects. The pieces are thin, flat, colored pieces 32, preferably made of a flexible plastic. Pieces 32 may include a set of squares 32a, a set of triangles 32b, and a set of parallelograms 32c, each set containing items in three different colors 36, 38, 40 corresponding to the top, front and right sides, respectively, of an object to be represented thereby (such as shown in FIG. 3). Selected pieces 32 may be used to construct a two-dimensional representation 26 of an object illustrated in card 30 or of an object 28 formed by selected cubes 34 on turntable 22 (FIG. 1). Similarly, each of cubes 34 has at least three sides 42, 44, 46 colored to represent the top, front and right side views, respectively. Cubes 34 are polyhedrons (solids bounded by plane sides).

Preferably, colors 36, 38, 40 of pieces 32 and colored sides 42, 44, 46 of cubes 34 correspond to the colors of sides 66a, 66b, 66c and views 54a, 54b, 54c, respectively. That is, the same color represents the same surface (top, front, or right side) in all the components of apparatus 10. Alternatively, other indicia of orientation such as patterns, letters, numbers, and so forth can be used to differentiate top, front and right side surfaces from each other. Raised symbols or textured surfaces may be helpful for visually-impaired users.

The components of apparatus 10 may be made of any suitable materials. For example, box 12 and insert 14 may be paper, plastic, metal, wood, etc. Insert 14 preferably fits snugly inside box 12, and may be integrally formed with the box. Cards 30 may made of be paper, metal, plastic, laminated paper, or other suitable material, and may be provided with a smooth, moisture-resistant surface so the cards can easily be wiped clean.

Each of pieces 32 may include means for detachedly adhering pieces to panels 14a, 14b. For example, panels 14a, 14b may be metallic, or contain thin metal plates so that magnetized pieces 32, or ferromagnetic powder-filled polymer pieces, will adhere to one of the panels when placed thereon (or, equivalently, the surface may be magnetized and the pieces made of metal). Inner surfaces 40a, 40b of panels 14a, 14b may be covered with the "loop" portion of a hook-and-loop fastener such as VELCRO™. Then, pieces 32 carry the corresponding "hook" fabric so that the pieces can be adhered to surfaces 40a, 40b. Alteratively, surfaces 40a, 40b may be a non-slip, high-friction material, or pieces 32 may carry a non-curing, low-tac adhesive that allows the pieces to be affixed to, and removed from, a surface without damage to the surface.

Apparatus 10 is used to teach and practice a number of tasks related to the preparation and interpretation of mechanical drawings: preparing two-dimensional isometric views from orthographic projections and vice versa, preparing two-dimensional isometric views and orthographic projections of three-dimensional objects, and preparing three-dimensional models from isometric views and/or orthographic projections. Apparatus 10 may be used by one person, or by two persons at a time, each using one of panels 14a, 4b as a work surface.

In use, the user selects a card 30 or constructs a three-dimensional object from cubes 34, and proceeds to construct a representation of the object by selecting, orienting and arranging pieces 32 on panels 14a, 14b. By way of example, a selected card 30 may be placed in slot 20 (FIG. 1). Card 30 depicts an isometric view or an orthographic projection (top, front and side views) of a three-dimensional object, similar to the views shown in FIGS. 2A and 2B. The user selects pieces 32, with each selected piece corresponding to a selected portion of the view depicted on card 30. Each selected piece 32 corresponds to a top, front or right side surface of the article, and has a preferred orientation corresponding to the orientation of the selected portion. The user orients the selected pieces 32, and positions the pieces onto surface 14a (or surface 14b) to construct the view seen on card 30. To construct a typical isometric view, parallelograms would be used to represent top, front and right side surfaces, with triangles representing partially-hidden surfaces; squares or rectangles are used to form orthographic projections. Alternatively, the user may select pieces 32 to form the other view, that is, form an orthographic projection when card 30 shows an isometric view, or form an isometric view when card 30 shows an orthographic projection. When completed, card 30 is turned over and the completed view is compared to that shown on the card.

To construct a two-dimensional representation of a three-dimensional object, the user places a number of cubes 34 on turntable 22 to form an object 28, with sides 42, 44, 46 of each cube oriented to indicate the top, front and right side surfaces, respectively. The user rotates turntable 22 to present object 28 at the appropriate angle for viewing, then proceeds to construct an isometric view or orthographic projection of the object by selecting pieces 32 to represent each visible surface of each cube 34. The selected pieces 32 are oriented and positioned on surface 14a (or surface 14b) to form a representation of object 28.

A number of other tasks can be performed with apparatus 10, including but not limited to the following: cubes 34 may be used to form three-dimensional representations of two-dimensional objects (cards 30 or two-dimensional representations formed by pieces 32); and pieces 32 may be used to form two-dimensional representations of a three-dimensional object 28 on turntable 22 (if present). Turntable 22 allows rotating model 28 so that one or more users can view an object from the optimum angle for forming the desired representation.

As noted above, apparatus 10 preferably includes a set of cards 30 of varying levels of difficulty. Thus, the user may progress to increasingly more difficult levels upon successfully completing the preceding levels. Timer 37 may be used to set a fixed or user-selected time limit (1 minute, 3 minutes, etc.) for completing the selected task, or two or more users may compete against one another to see who can Complete a task correctly in the shortest period of time. If desired, dice 39 may be used to select which of two users starts first, which of cards 30 to use, how many cubes 34 may be used to construct an object, or which type of task to perform (isometric view→orthographic projection, three-dimensional object→isometric view, orthographic projection→three-dimensional model, etc.).

Turning now to FIG. 4, there is shown an apparatus 100 according to another preferred embodiment of the present invention. Apparatus 100 includes a box 102 with two opposing, hingedly-attached panels 104a, 104b, and an insert 106 snugly fitted into the interior of box 102. Insert 106 has a plurality of recessed compartments 108 and at least one transverse slot 110. Compartments 108, like compartments 18 of above-described apparatus 10, are dimensioned for storing components such as cards 30, pieces 32, cubes 34, timer 37, dice 39.

Worksheets such as a worksheet 114 may be stored in a suitably-dimensioned compartment 108. Worksheet 114 includes a square grid 116 for use in drawing orthographic projections and a hexagonal grid 118 for use in drawing isometric views. Grids 116 and 118 are preferably arranged side-by-side on worksheet 114, however, the grids may be on opposing sides of worksheet 114 or printed on different worksheets if preferred. Worksheets 114 may be supplied in the form of individual sheets, or as a tablet or workbook holding a plurality of sheets.

A user "P" places a card 30 in slot 110, and, using a blank worksheet 114, proceeds to draw the view depicted on card 30. If card 30 shows an orthographic projection, user P draws the corresponding isometric view 120 of the object on grid 118. Conversely, if card 30 shows an isometric view, the user draws the corresponding orthographic projections on grid 116. Worksheets 114 may, of course, be used with above-described apparatus 10 for practice in drawing views of representations formed with pieces 32 and cubes 34. Pieces 32, cubes 34, timer 37, and dice 39, if present, are used in the manner described above for apparatus 10.

Cubes 34 are preferably true cubes, however, other three-dimensional items may be used if desired. By way of example, other polyhedrons, solids formed by adding or subtracting material from a polyhedron, solids having rectangular or wedge-shaped cutouts, beveled edges, and so forth, may be used. FIG. 5 shows a rectangular cube 130 having a square cross-section, a cube 132 with an arcuate cut-out 134, and a cube 136 having a triangular cross-section.

Apparatus 10 and apparatus 100 may include instruction materials, one or more sets of cards 30 having different levels of difficulty, and worksheets 114. If desired, panel 14 may be provided in the form of an electronic "surface" displayed on a video monitor, together with a card 30 and a plurality of images corresponding to pieces 32 and cubes 34. The user would select, orient and position a piece 32 (or cube 34) with a joystick, mouse, trackball, keyboard, or other suitable means. Similarly, worksheets 114 could be provided in the form of video images, so that the user could "draw" a selected view using a light pen or the like.

The present invention provides an effective "hands on" teaching tool that allows each user to progress individually at the maximum rate of which he or she is capable. Use of the invention encourages development of the ability to visualize within two dimensions and three dimensions, visualize three-dimensional objects from two-dimension representations, construct two-dimension and three-dimension representations of two-dimension and three-dimension objects, prepare and interpret isometric view drawings, and prepare and interpret orthographic projection drawings. Pieces 32 and cubes 34 may be formed with textured surfaces or other indicia that assist a visually impaired user to comprehend the concept of three-dimensional shape. The apparatus can be used by two or more users, who may compete against one another to see who can complete a task faster or more accurately in a predetermined period of time.

It will be apparent to those skilled in the art that many changes and substitutions can be made to the preferred embodiment herein described without departing from the spirit and scope of the present invention as defined by the appended claims.

What is claimed is:

1. An apparatus, comprising:

a set of cards having a first side and an opposing second side, said first side depicting orthographic views of an object, said second side depicting an isometric view of said object, said object being defined by a number of cubes in adjacent relationship so that said orthographic views are composed of squares and said isometric views are composed of parallelograms and triangles;

a plurality of pieces in the shape of squares, parallelograms and triangles; and said object having a top, a front and a right side, said orthographic and isometric views showing said top as carrying a first indicator of orientation, said front as carrying a second indicator of orientation, and said right side as carrying a third indicator of orientation, and said plurality of pieces further comprising three sets of pieces, a first set that carries said first indicator of orientation, a second set that carries said second indicator of orientation, and a third set that carries said third indicator of orientation so that pieces from said first, said second, and said third sets can be selected to properly orient said reproductions and interpretations of said isometric and orthographic views.

2. The apparatus as recited in claim 1, further comprising a surface on which said pieces are placed, said surface having means for holding said pieces in place.

3. The apparatus as recited in claim 1, wherein said pieces are magnetic and said apparatus further comprises a metal surface on which said pieces are placed.

4. The apparatus as recited in claim 1, further comprising a set of cubes, and said object having a top, a front and a right side, said object being formable by arranging cubes from said set of cubes, said orthographic and isometric views of said object showing said top as carrying a first indicator of orientation, said front as carrying a second indicator of orientation, and said right side as carrying a third indicator of orientation, and said plurality of pieces further comprises three sets of pieces, a first set that carries said first indicator of orientation, a second set that carries said second indicator of orientation, and a third set that carries said third indicator of orientation so that pieces from said first, said second, and said third set can be selected to properly orient reproductions and interpretations of said isometric and orthographic views of said objects.

5. The apparatus as recited in claim 1, further comprising a turntable and a set of cubes, said object being formable by arranging cubes on said turntable from said set of cubes, said turntable being rotatable so that said pieces can be viewed from different angles for reproducing and interpreting orthographic and isometric views of said object.

6. The apparatus as recited in claim 1, further comprising a turntable and a set of cubes, said object being formable by arranging cubes from said set of cubes on said turntable, said turntable being rotatable so that said pieces can be viewed for reproducing and interpreting orthographic and isometric views of said cubes, each cube having a top, a front and a right side, said orthographic and isometric views show said top as carrying a first indicator of orientation, said front carrying a second indicator of orientation, and said right side carrying a third indicator of orientation, and said plurality of pieces further comprising three sets of pieces, a first set that carries said first indicator of orientation, a second set that carries said second indicator of orientation, and a third set that carries said third indicator of orientation so that pieces from said first, said second, and said third set can be selected to orient reproductions and interpretations of said isometric and orthographic views of said cubes.

7. The apparatus as recited in claim 1, further comprising a container having compartments for said cards and said plurality of pieces.

8. The apparatus as recited in claim 1, further comprising dice and means for keeping track of time.

9. An apparatus, comprising:

a set of cards having a first side and an opposing second side, said first side depicting orthographic views of an object, said second side depicting an isometric view of said object, said object being composed of solid forms in adjacent relationship so that said orthographic views and said isometric views are composed of a limited number of geometric shapes;

a plurality of pieces having said shapes;

a surface for placement of said pieces, said surface carrying means for holding said pieces in place; and a set of solid forms, and said object having a top, a front and a right side, said object being formable by arranging solid forms from said set of solid forms, said orthographic and isometric views of said object showing said top as carrying a first indicator of orientation, said front as carrying a second indicator of orientation, and said right side as carrying a third indicator of orientation, and said plurality of pieces further comprises three sets of pieces, a first set that carries said first indicator of orientation, a second set that carries said second indicator of orientation, and a third set that carries said third indicator of orientation so that pieces from said first, said second, and said third set can be selected to properly orient reproductions and interpretations of said isometric and orthographic views of said objects.

10. The apparatus as recited in claim 9, wherein said holding means further comprises metal carried by said surface and wherein said plurality of pieces are made of a magnetic material so that said pieces adhere to said surface.

11. The apparatus as recited in claim 9, wherein said object has a top, a front and a right side, said orthographic and isometric views showing said top as carrying a first indicator of orientation, said front as carrying a second indicator of orientation, and said right side as carrying a third indicator of orientation, and said plurality of pieces further comprising three sets of pieces, a first set that carries said first indicator of orientation, a second set that carries said second indicator of orientation, and a third set that carries said third indicator of orientation so that pieces from said first, said second, and said third sets can be selected to properly orient said reproductions and interpretations of said isometric and orthographic views.

12. The apparatus as recited in claim 9, further comprising a turntable and a set of solid forms, said object being formable by arranging solid forms on said turntable from said set of solid forms, said turntable being rotatable so that said pieces can be viewed from different angles for reproducing and interpreting orthographic and isometric views of said object.

13. The apparatus as recited in claim 9, further comprising a turntable and a set of solid forms, said object being formable by arranging solid forms from said set of solid forms on said turntable, said turntable being rotatable so that said pieces can be viewed for reproducing and interpreting orthographic and isometric views of said solid forms, each solid form having a top, a front and a right side, said orthographic and isometric views show said top as carrying a first indicator of orientation, said front carrying a second indicator of orientation, and said right side carrying a third indicator of orientation, and said plurality of pieces further comprising three sets of pieces, a first set that carries said first indicator of orientation, a second set that carries said second indicator of orientation, and a third set that carries said third indicator of orientation so that pieces from said first, said second, and said third set can be selected to orient reproductions and interpretations of said isometric and orthographic views of said solid forms.

14. The apparatus as recited in claim 9, further comprising means for keeping track of time.

15. The apparatus as recited in claim 9, further comprising dice.

16. The apparatus as recited in claim 9, further comprising a container having compartments for said cards and said plurality of pieces.

17. An apparatus, comprising:

a container having a plurality of compartments including a first and a second compartment;

a set of cards having a first side and an opposing second side, said first side depicting orthographic views of an object, said second side depicting an isometric view of said object, said object being composed of solid forms in adjacent relationship so that said orthographic views and said isometric views are composed of a limited number of geometric shapes, said first compartment dimensioned for said set of cards;

a plurality of pieces having said shapes, said second compartment dimensioned for said plurality of pieces;

a surface hingedly attached to said container for placement of said pieces, said surface carrying means for holding said pieces in place; and a turntable and a set of solid forms, said object being formable by arranging solid forms on said turntable from said set of solid forms, said turntable being rotatable so that said pieces can be viewed from different angles for reproducing and interpreting orthographic and isometric views of said object.

18. The apparatus as recited in claim 17, further comprising dice and means for keeping track of time.

19. The apparatus as recited in claim 17, wherein said holding means further comprises metal carried by said surface and wherein said plurality of pieces are made of a magnetic material so that said pieces adhere to said surface.

20. The apparatus as recited in claim 17, wherein said object has a top, a front and a right side, said orthographic and isometric views showing said top as carrying a first indicator of orientation, said front as carrying a second indicator of orientation, and said right side as carrying a third indicator of orientation, and said plurality of pieces further comprising three sets of pieces, a first set that carries said first indicator of orientation, a second set that carries said second indicator of orientation, and a third set that carries said third indicator of orientation so that pieces from said first, said second, and said third sets can be selected to properly orient said reproductions and interpretations of said isometric and orthographic views.

* * * * *